United States Patent Office 3,327,816
Patented June 27, 1967

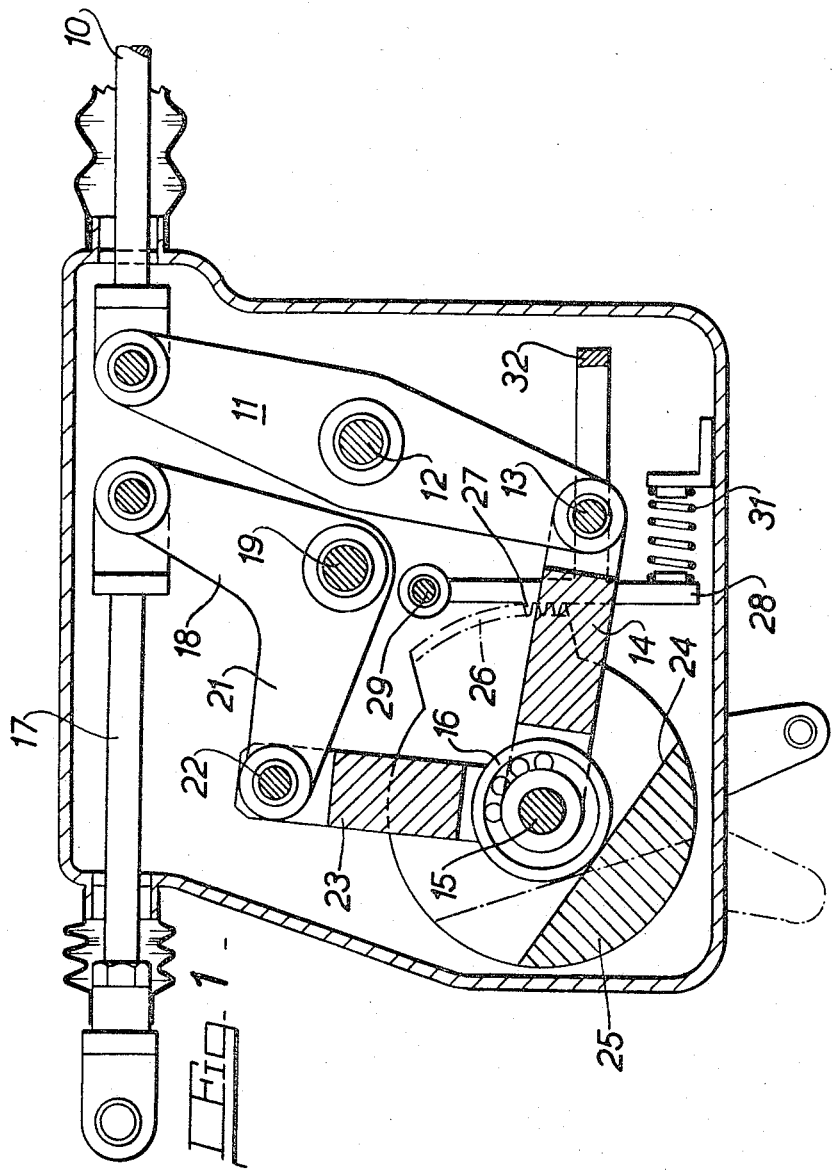

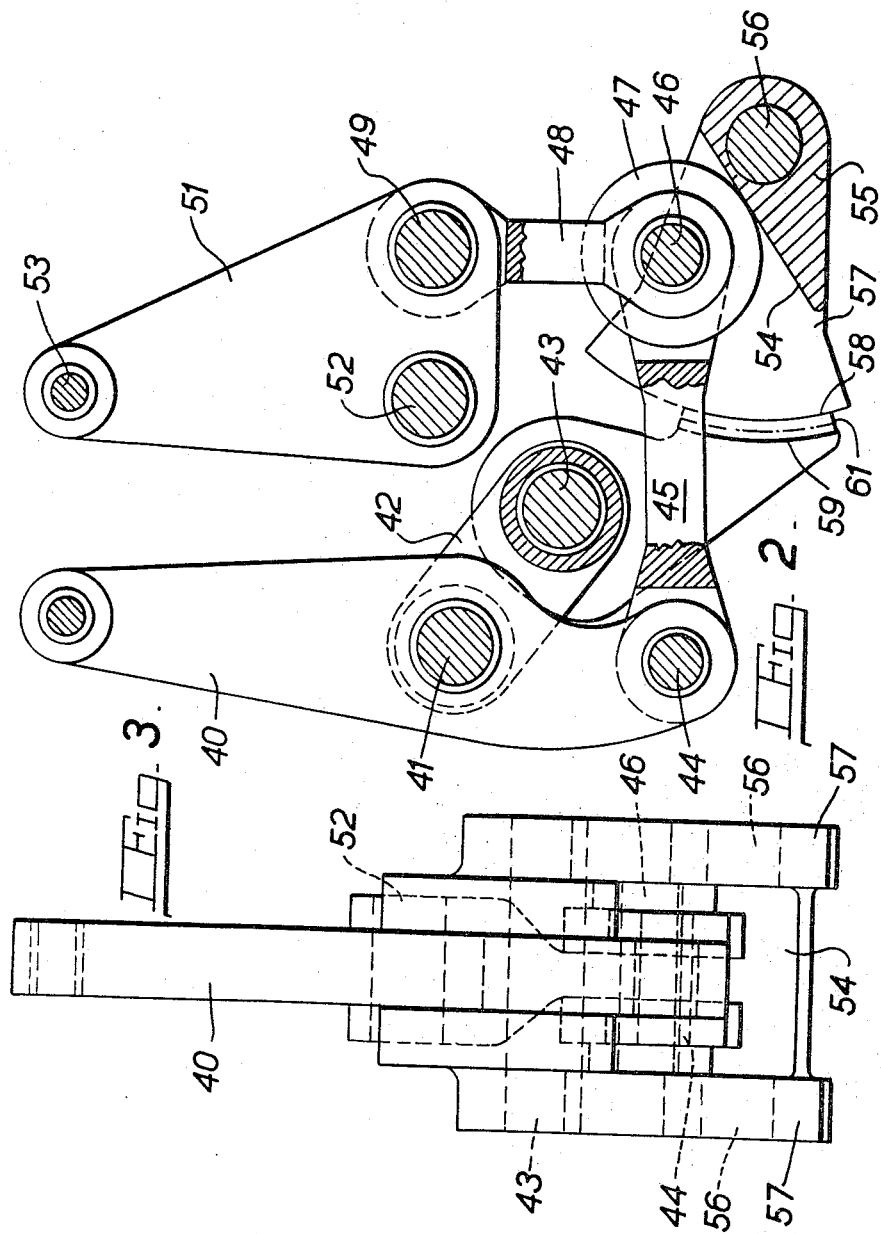

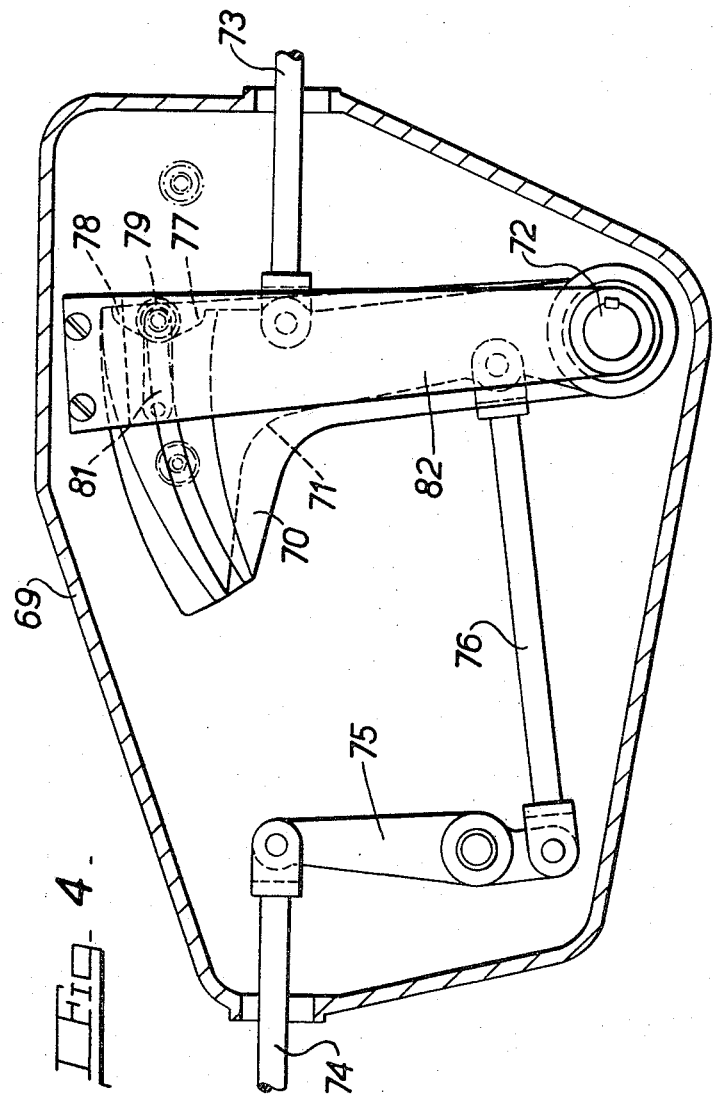

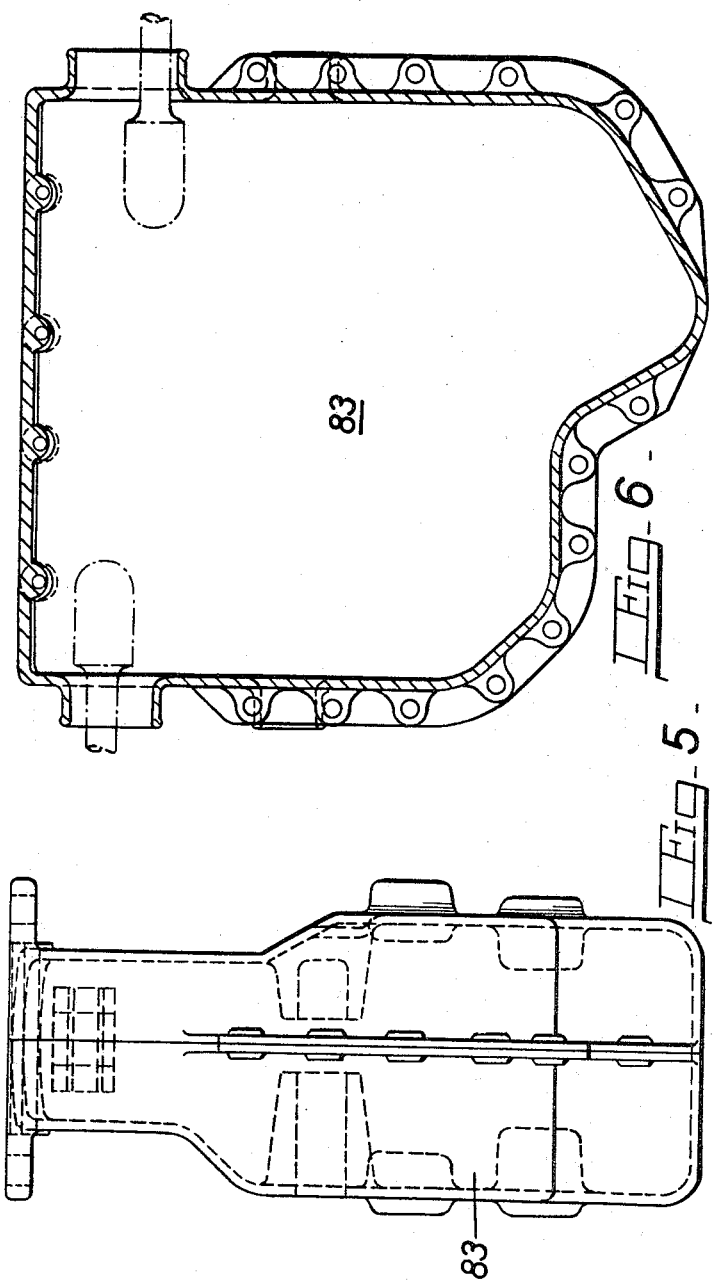

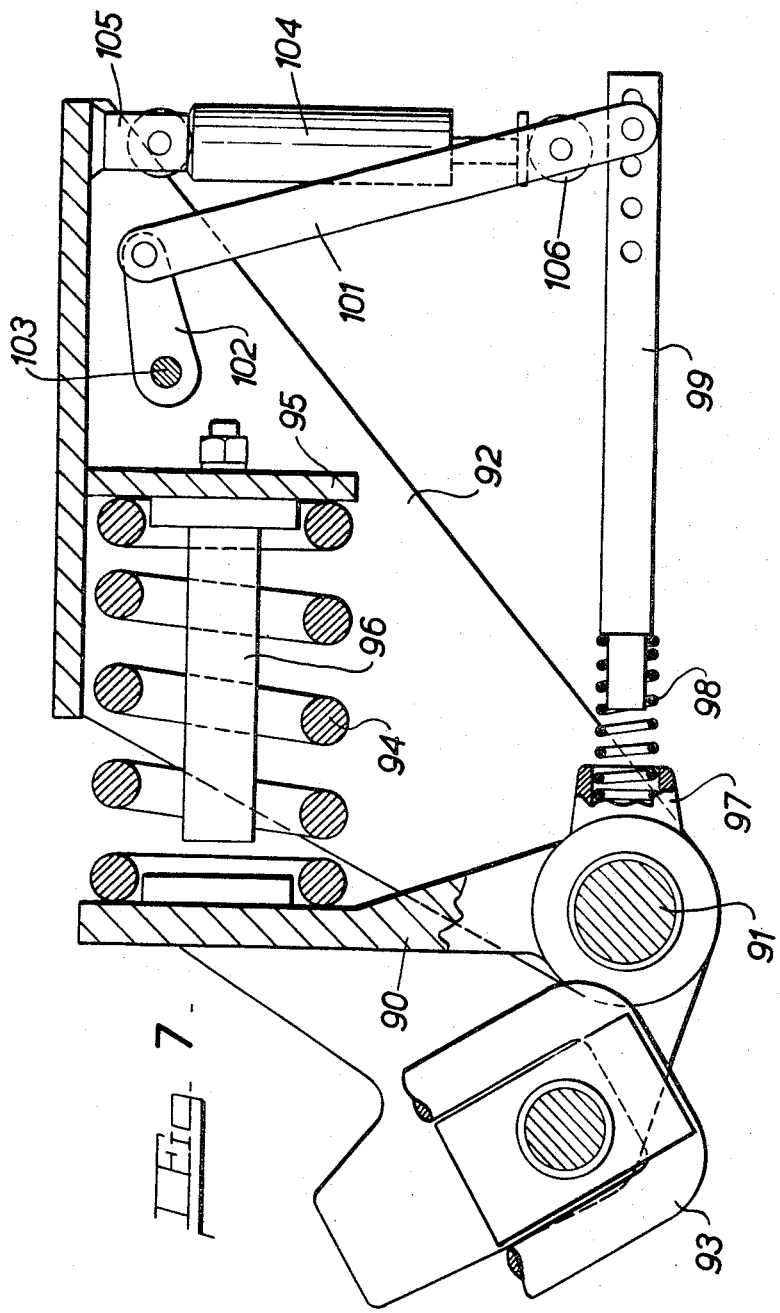

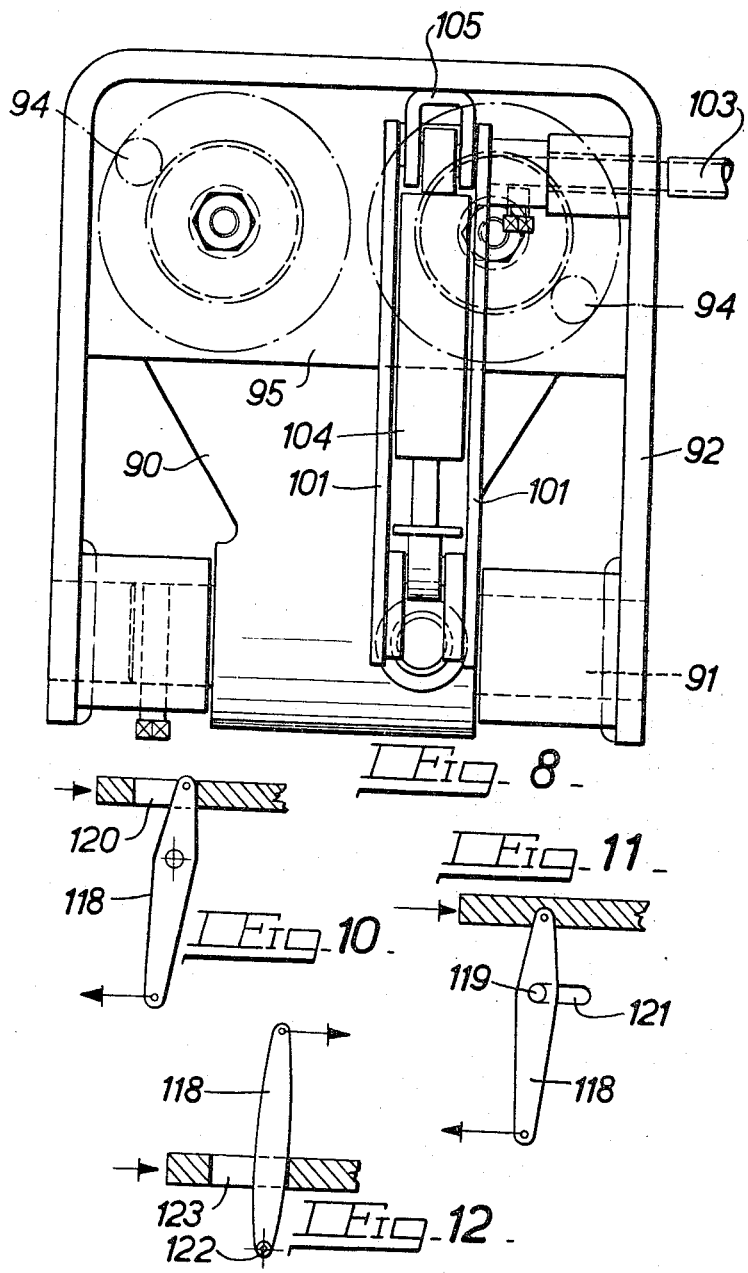

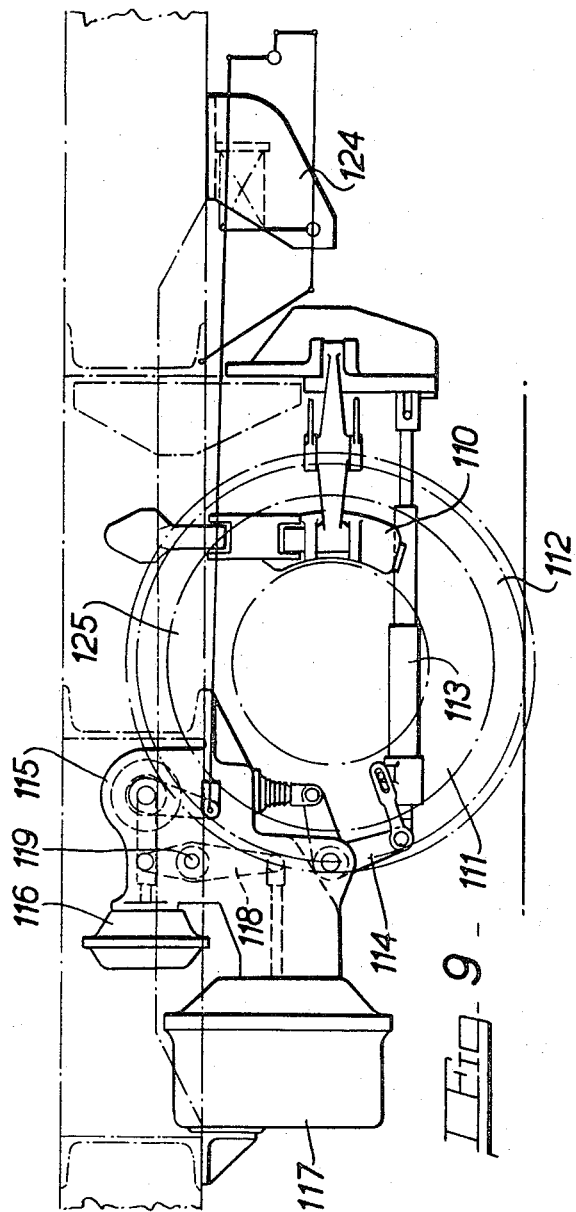

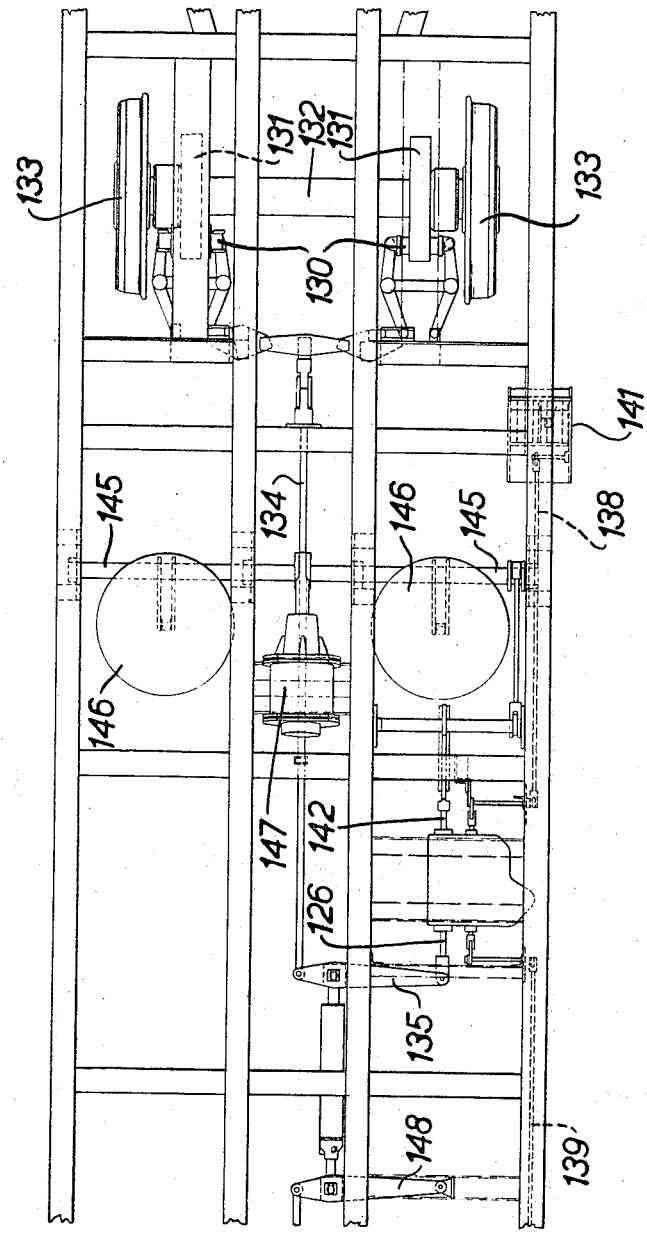

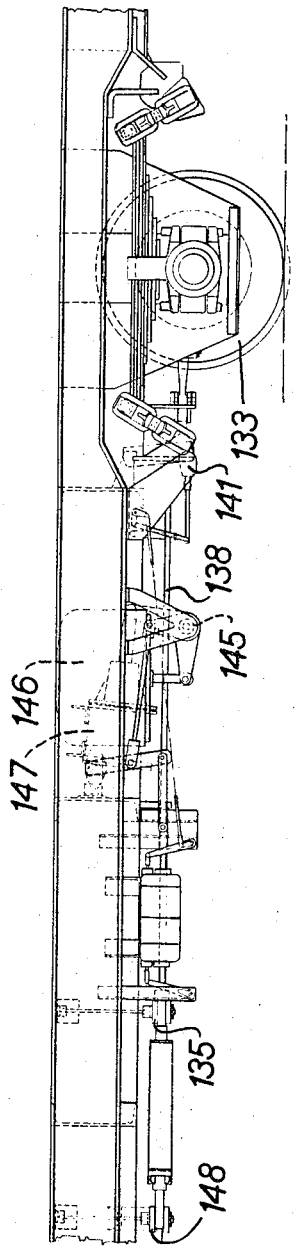

3,327,816
BRAKING SYSTEMS FOR VEHICLES
Maurice B. Eaton, Kings Norton, Birmingham, England, assignor to Girling Limited, Tyseley, Birmingham, England, a British company
Filed Oct. 29, 1965, Ser. No. 505,668
Claims priority, application Great Britain, Oct. 30, 1964, 44,275/64; Nov. 4, 1964, 45,040/64; Nov. 5, 1964, 45,148/64; Mar. 2, 1965, 8,755/65, 8,756/65
10 Claims. (Cl. 188—195)

This invention relates to improvements in braking systems for vehicles and more particularly to means for controlling the braking effort applied to wheels of rail or other vehicles in accordance with the loading on the axles.

According to one feature of my invention a vehicle brake is applied through a system of cooperating levers of which one, acted on by an applying force, actuates another lever coupled to the brake through mechanism incorporating a roller cooperating with an inclined surface of which the inclination is automatically varied in accordance with the loading on the braked wheel or wheels, the arrangement being such that the leverage between the applying force and the brakes increases automatically with increase in loading, and there is provided in the mechanism a certain amount of lost motion which is a maximum when the vehicle is unladen and is reduced to a minimum or to zero when the vehicle is fully laden.

According to another feature of my invention means sensitive to the loading of different axles of a vehicle are coupled to separate members angularly movable in the same direction about a common axis and carrying complementary cam surfaces cooperating with a roller or other member actuating means for controlling the braking effort, the arrangement being such that the braking effort applied to the wheels on both axles is proportional to the loading on the less heavily loaded axle, and if either of the means sensitive to axle loading should fail or does not function properly the maximum braking effort which can be applied is that corresponding to the unladen condition of the vehicle so that the risk of locking any of the wheels is reduced to a minimum.

The member actuating means for controlling the braking effort is conveniently arranged to control the inclination of the inclined surface forming part of the system of cooperating levers referred to above, and that system and the means sensitive to axle loading are preferably enclosed in a common housing which forms a unit adapted to be detachably secured to the frame of a vehicle.

In the event of failure of any part of the mechanism or when servicing is required, the complete unit can be removed and another substituted so that the vehicle is out of action for a minimum period.

According to another feature of my invention brake control means sensitive to axle loading comprise a lever which is angularly movable in accordance with axle loading in opposition to resistance offered by a spring or springs and is coupled through a yielding resilient coupling member to an arm of which the movement is controlled by a damper and which, through one or more levers or other transmission members, effects angular movement of a shaft operable to control the braking effort applied to a wheel or wheels carried by the axle.

According to a still further feature of my invention a power input member of the brake rigging or linkage of a braking system for rail vehicles is operated directly by one fluid pressure actuator and is operated by a second fluid pressure actuator through a pivoted lever, a sufficient degree of lost motion being introduced to allow operation by one actuator without affecting the other.

One actuator may be a compressed air motor and the other may be a vacuum motor.

A braking system for a rail vehicle and components of the system forming the various features of my invention are illustrated by way of example in the accompanying drawings in which:

FIGURE 1 is a diagrammatic elevation of a lever system for varying the leverage between an applying force and the brakes;

FIGURE 2 is a similar elevation of an alternative form of lever mechanism;

FIGURE 3 is an end view of the mechanism shown in FIGURE 2;

FIGURE 4 is a diagrammatic elevation of mechanism for varying the leverage in the mechanism shown in FIGURE 1 or FIGURE 2 in accordance with the loading on the less heavily loaded of two axles of the vehicle;

FIGURE 5 is an end view of a housing for the mechanism shown in FIGURES 1 or 2 and 4;

FIGURE 6 is a front elevation of one half of the housing shown in FIGURE 5;

FIGURE 7 is a diagrammatic elevation of mechanism sensitive to axle loading and designed to control the output from the mechanism shown in FIGURE 4;

FIGURE 8 is an end view of the mechanism shown in FIGURE 7;

FIGURE 9 is a side elevation of a vehicle incorporating braking mechanism in accordance with my invention;

FIGURES 10, 11 and 12 are diagrammatic views showing different arrangements of the means through which two actuators operate the braking mechanism shown in FIGURE 9; and FIGURES 13 and 14 are a plan and side elevation respectively of part of the frame for a two-axle rail vehicle incorporating braking mechanism in accordance with my invention.

FIGURE 1 shows a system of co-operating levers for the application of a brake. An input pull-rod 10 is coupled to an end of a lever 11 mounted for angular movement about a fixed pivot 12 at an intermediate point in its length. The other end of the lever is pivotally connected by a pin 13 to the free end of a link 14 of which the other end is rotatably mounted on a spindle 15 carrying a roller 16, the link 14 extending substantially at right angles to the lever 11.

An output pull-rod 17 connected to the brake and substantially in alignment with the input pull-rod 10 is coupled to one arm 18 of a bell-crank lever pivoted about a fixed pivot 19 spaced from the pivot 12. The arm 18 of the bell-crank lever is substantially parallel to the lever 11. The second arm 21 of the bell-crank lever which extends in a direction away from the first lever is pivotally connected by a pin 22 to the free end of a second link 23 of which the other end is rotatably mounted on the roller spindle 15. The two links 14 and 23 are substantially at right angles to each other.

The roller 16 engages with an inclined surface 24 on an angularly movable carrier 25 coupled to means described below which are sensitive to the loading of the braked wheel or wheels whereby the inclination of the surface varies with loading. The carrier 25 is provided with an arcuate toothed sector 26 cooperating with complementary teeth 27 on a locking bar 28 to hold the carrier against angular movement except when the brake is off. The locking bar is pivoted on a fixed pivot 29 and is urged into engagement with the toothed sector by a spring 31, the bar having an abutment 32 which is engaged by the first lever 11 to free the bar from the sector when the brake is released so that the carrier can move angularly into a position dependent on the vehicle loading.

Preferably the axis about which the carrier is angularly movable is arranged to coincide substantially with the axis of the roller spindle when the brake is fully applied with the vehicle fully laden. That is the position of the mechanism shown in FIGURE 1.

When the input pull-rod is actuated the first lever 11 is moved angularly about its pivot and, through the first link 14, urges the roller 16 along the inclined surface 24. The roller, through the second link 23, moves the bell-crank lever angularly about its pivot to actuate the output pull-rod 17 and apply the brake. The effective leverage between the input and output pull-rods depends on the inclination of the surface on which the roller rolls and that in turn depends on the vericle loading.

In the laden condition of the vehicle the surface 24 on which the roller rolls is inclined at an angle of less than 45° to the link connected to the first lever and in the unladen condition it is inclined at an angle greater than 45° to that link.

The geometry of the mechanism is such that when the vehicle is fully laden and the brake is applied the input rod moves through a substantially greater distance than the output rod and the effective leverage is high. Conversely when the vehicle is unladen and the roller is in engagement with the inclined surface the output rod moves through a greater distance than the input rod and the leverage is relatively low.

The mechanism described above is particularly advantageous where the applying force is a vacuum cylinder.

The output force from a vacuum cylinder decreases as the stroke of the piston increases, owing to the reduction in the volume of the chamber on the vacuum side of the piston which reduces the differential pressure on the piston.

When a vacuum cylinder actuates a brake through the normal lever and linkage mechanism the first part of the stroke takes up clearances while the next part takes up deflection. There is a greater amount of deflection when the vehicle is laden than when it is unladen so that a longer stroke is required from the vacuum cylinder when the vehicle is laden and the actual application of the brake is effected when the piston of the vacuum cylinder has moved through a substantial part of its stroke and the power available is reduced.

In mechanism as described above this difficulty is overcome by providing between the first or actuating lever 11 and the bell-crank or actuated lever a certain amount of lost motion which is a maximum when the vehicle is unladen and is reduced to a minimum or to zero when the vehicle is laden.

For example, when the vehicle is unladen and the inclined surface 24 with which the roller cooperates is at a corresponding angle the roller 16 in the off position of the brake may be spaced at a substantial distance from the inclined surface 24. In the application of the brake the actuating lever 11 can therefore move through a substantial angle before there is any movement of the bell-crank or output lever to take up clearances and deflection.

When the brake is applied with the vehicle in the fully laden condition the inclined surface 24 has already been adjusted by the change in loading to the appropriate angular position in which the roller is in engagement with, or is closely adjacent to, the inclined surface so that the whole of the stroke of the vacuum cylinder is available to take up clearances and deflection, and with the inclined surface in that position the effective leverage between the input rod 10 and the output rod 17 is high so that a maximum braking effort is obtained.

It is preferred to provide a small clearance between the roller and the inclined surface in the off position of the brake even when the vehicle is fully laden, as this avoids impact between these members due to vibration or oscillation of the vehicle, and avoids wear and damage to the mechanism.

In the modified lever mechanism shown in FIGURES 2 and 3 an input pull-rod (not shown) is pivotally connected to the free end of an input lever 40. The lever is pivoted at an intermediate point in its length on a pin 41 between parallel arms 42 which are angularly movable about a fixed pivot 43. The other end of the lever 40 is pivotally connected by a pin 44 to the free end of a link 45 of which the other end is rotatably mounted on the spindle 46 of a roller 47, the link extending substantially at right angles to the lever. A second link 48 is also rotatably mounted on the roller spindle 46 and is substantially at right angles to the link 45. The free end of the link 48 is pivotally connected by a pin 49 to one corner of a triangular plate 51 which can be regarded as a bell-crank lever and is mounted to swing about a fixed pivot 52. The other corner of the plate has pivoted to it by a pin 53 an output pull-rod (not shown) which is connected to the brakes and is substantially in alignment with the input pull-rod.

The roller 47 cooperates with an inclined surface 54 on a carrier 55 which is angularly movable about a fixed pivot 56 by means sensitive to the loading of the braked wheels whereby the inclination of the surface 54 varies with axle loading.

Integral with or rigidly secured to the carrier 55 are spaced lugs 57 of which the outer ends are formed as arcuate surfaces 58 concentric about the axis of the carrier. These surfaces are normally spaced from complementary concave arcuate surfaces 59 on lugs integral with or rigidly secured to the arms 42 between which the lever 40 is pivoted. A layer of friction material 61 is bonded or otherwise secured to the arcuate surfaces of one pair of the lugs to provide a frictional engagement between the two pairs of lugs preventing angular movement of the carrier 55 except when the brake is in the off position. The functioning of this lever assembly is the same as that of the assembly shown in FIGURE 1 and described above.

FIGURE 4 illustrates mechanism for varying the angular position of the carrier 25 or 55 described above in accordance with the loading on the less heavily loaded of two axles of a vehicle.

In the arrangement illustrated the mechanism is located in a housing 69 mounted on the vehicle between the axles. Two parallel arms 70 and 71 are mounted at their lower ends on a common shaft 72 about which they are angularly movable independently. A rod 73 from means sensitive to the load on one axle is pivotally coupled to the arm 70, and a link 74 from means sensitive to the load on the other axle is coupled to the arm 71 through a reversing lever 75 and a link 76 so that both arms are moved angularly in the same direction by an increase or decrease of the loading on the respective axles. The upper ends of the arms carry or are formed as complementary cam surfaces 77, 78 which lie in the same vertical plane but are staggered vertically. The upper cam surface 78 is curved upwardly and outwardly and the other is curved downwardly and outwardly, and when the loading on both axles is equal both cam surfaces engage at their adjacent ends with a roller 79 in the free end of a link 81 pivotally mounted on a lever 82 keyed on the shaft 72 about which the arms 70 and 71 are angularly movable. The shaft 72 is adapted to be coupled either directly or through any convenient form of transmission to the carrier 25 or 55 of either of the lever mechanisms described above to vary the leverage of the mechanism in accordance with axle loading.

So long as the loading on the axles remains equal the levers 70 and 71 are moved through the same angle by the load sensitive means on a change in the loading and the roller 79 remains in the position shown in the drawing in which it is in engagement with both cam surfaces 77, 78 at their adjacent ends, the braking effort being increased or decreased by change in the loading on the axles.

However, if the loading on one axle is increased above that on the other axle the arm 70 or 71 coupled to the means sensitive to the loading on the first axle is moved through a greater angle than the other and the contour of the cams 77, 78 is such that the roller 79 is displaced vertically into engagement with the cam surface on the arm coupled to the means sensitive to the loading on the second or less heavily loaded axle. The angular position of the lever 82 and hence the braking effort is thus controlled by the loading on the less heavily loaded axle, and any increase in the loading on the other axle does not alter the position of the roller so that the braking effort applied to the wheels on both axles remains proportional to the loading on the less heavily loaded axle.

The mechanism shown in FIGURE 1 or FIGURE 2 and the mechanism shown in FIGURE 3 can readily be located in a common casing or housing 83 as shown in FIGURES 5 and 6. Where the two mechanisms are in a common housing the shaft 72 shown in FIGURE 4 may be continuous with or directly coupled to the shaft of the carrier 25 or 55. The housing is detachably bolted to the frame of the vehicle and if any part of the mechanism should fail the housing can be removed as a unit and another substituted.

FIGURES 7 and 8 illustrate load-sensitive mechanism for controlling the mechanism illustrate in FIGURE 4 and described above.

A bell-crank lever 90 is keyed on a horizontal shaft 91 mounted in bearings in a rigid U-shaped bracket 92 bolted or otherwise secured to the frame of the vehicle. One arm of the lever which is substantially horizontal is coupled to a part 93 of the suspension of an axle in such a manner that an increase in the axle loading moves the outer end of this arm upwardly. The other arm of the lever is substantially vertical and is loaded by two parallel horizontal coil springs 94 located between the arm and an abutment 95 on the bracket, the springs opposing upward movement of the first arm. Stops 96 are provided to limit the compression of the springs and hence the angular movement of the lever.

Opposite the first arm the lever has a radially projecting horizontal boss 97 in which is fixed one end of a closely coiled spring 98. One end of a horizontal arm 99 is fixed in the other end of this spring which is sufficiently stiff to ensure that on a steady movement of the lever the arm moves angularly with it but on a rapid or short-term movement of the lever the spring can yield and allow the movement of the arm to lag behind that of the lever.

The other end of the arm 99 is connected by a link 101 to a lever 102 keyed on a shaft 103 rotatably mounted in the bracket 92. The shaft 103 is adapted to be coupled to and actuate one of the rods 73 or 74 shown in FIGURE 4. A damper 104 is connected between an anchorage 105 on the bracket and an abutment 106 on the link 101 adjacent to its connection to the arm 109. The damper offers a relatively small damping effort to slow movement of the arm 109 and a relatively high resistance to rapid movement such as can be caused by vibration or inequalities in the track.

In a four-wheeled rail vehicle a unit as described above will be associated with each axle, the shafts 103 of the two units actuating respectively the rods 73 and 74 of the unit illustrated in FIGURE 4.

In many countries regulations relating to rail vehicles require that the braking system shall be operable by two independent power means, the power usually being provided by a motor operated by compressed air and a vacuum motor.

FIGURE 9 illustrates a brake layout complying with these requirements and incorporating the mechanisms described above. Caliper brake shoes 110, are applied to a disc 111 forming part of a wheel 112 or mounted on an axle carrying the wheel. The brake rigging includes an automatic slack adjuster 113 and a bell-crank lever 114. The lever is actuated by the output rod of ratio-changing mechanism as described above with reference to FIGURES 1 or 2 and 4 housed in a casing 115 mounted on the vehicle frame. The input rod of the mechanism is acted on directly by a compressed air motor 116 and is acted on by a vacuum motor 117 through a lever 118 pivoted at an intermediate point in its length on a pin 119, a sufficient degree of lost motion being introduced to allow operation of the brake by one actuator without affecting the other.

The lost motion may be introduced in various ways of which these are shown in FIGURES 10, 11 and 12.

In FIGURE 10 the upper end of the lever 118 is slidably engaged in a slot 120 in the input rod.

In FIGURE 11 the pin 119 about which the lever 118 pivots is mounted to slide in a slot 121 in a stationary part, the slot being substantially at right angles to the axis of the lever.

In FIGURE 12 the lever 118 is pivoted at its lower end on a fixed pin 122. The motor 116 acts on the upper end of the lever and the lever passes through an elongated slot 123 in the input rod on which the motor 117 acts directly.

The braking effort is controlled in accordance with the axle loading by load-sensitive mechanism indicated at 124 and coupled to the ratio-changing mechanism by a rod 125.

FIGURES 13 and 14 show a brake layout for a two-axled fast freight wagon. Only one axle is shown with part of the rigging leading to the brakes on the other axle.

The brakes are caliper brakes 130 acting on opposite faces of brake discs 131 mounted on and rotating with an axle 132 carrying wheels 133. The brakes are applied through a rod 134 coupled to one end of a pivoted lever 135 of which the other end is coupled to the output pull rod 136 of a lever system of variable leverage as shown in FIGURE 1 or FIGURE 2 housed in a casing 137 incorporating also mechanism as shown in FIGURE 4 controlled by axle loading. That mechanism is controlled in accordance with axle loading by rods 138 and 139 connected to load-sensitive means associated with the suspension of each axle, the means associated with the axle 132 being shown at 141.

The input lever of the lever mechanism is actuated by a rod 142 from a transverse shaft 143 which is actuated by a link 144 from a cross shaft 145. The shaft 145 is actuated selectively by a pair of vacuum motors 146 and a compressed air motor 147. The brakes on the other axle are applied from a lever 148 coupled to the lever 135 by a slack adjuster 149.

What is claimed is:

1. Means for actuating a brake on at least one wheel of a rail vehicle comprising a lever system including a first lever acted upon by an applying force, and a second lever coupled to the brake and actuated by said first lever, a mechanism through which said first lever actuates said second lever, said mechanism incorporating a roller, an inclined surface with which the roller is adapted to cooperate, means for varying the inclination of said inclined surface in accordance with the loading on the braked wheel whereby leverage between the applying force and the brake increases automatically with increase in loading, and means providing a certain amount of lost motion between said first lever and said second lever in the application of the brake, said lost motion means being at a maximum when the vehicle is unladen and being reduced to a minimum when the vehicle is fully laden.

2. Brake actuating means as claimed in claim 1, and further including means for preventing variation in the inclination of said inclined surface except when the brake is in the off position.

3. Means for actuating a brake on at least one wheel of rail vehicle comprising a lever having a first end and a second end, and adapted to be acted on at said first end by an applying force, a pivot about which said first lever is adapted to pivot at an intermediate point in its length, a roller, a spindle carrying said roller, a first link connecting said second end of said lever to said spindle, a bell-crank lever, a fixed pivot about which said bell-crank lever is adapted to pivot, a second link connecting one arm of said bell-crank lever to said spindle and extending substantially at right angles to said first link, the other arm of said bell-crank lever being adapted to be connected to said brake, a carrier incorporating an inclined surface with which said roller is adapted to cooperate, means for moving said carrier angularly in accordance with the loading on the braked wheel to varying the inclination of said inclined plane, whereby leverage between the applying force and the brake increases automatically with increase in loading, and means providing a certain amount of lost motion between said first lever and said second lever in the application of the brake, said lost motion means being at a maximum when the vehicle is unladen and being reduced to a minimum when the vehicle is fully laden.

4. Brake actuating mechanism as claimed in claim 3, and further including means cooperating with a portion of said carrier to hold said carrier against angular movement when the brake is applied, but from which said carrier is disengaged on release of the brake.

5. Means for actuating brake on wheels on two axles of a rail vehicle comprising a lever system including a first lever acted upon by an applying force, and a second lever coupled to the brake and actuated by said first lever, a mechanism through which said first lever actuates said second lever, said mechanism incorporating a roller, an inclined surface with which the roller is adapted to cooperate, means for varying the inclination of said inclined surface in accordance with the loading on a braked wheel whereby leverage between the applying force and the brake increases automatically with increase in loading, means for varying the inclination of said inclined surface in accordance with the less heavily loaded of the axles, and means providing a certain amount of lost motion between said first lever and said second lever in the application of the brake, said lost motion means being at a maximum when the vehicle is unladen and being reduced to a minimum when the vehicle is fully laden.

6. Brake actuating means as claimed in claim 5 in which means for varying the inclination of the said surface comprise parallel arms which are angularly movable independently about a common shaft and are respectively coupled to means sensitive to the loading on the two axles, a lever keyed on the shaft which is adapted to move angularly a member carrying the inclined surface, and a roller carried by a link mounted on the lever and cooperating with oppositely curved cam surfaces on the arms, the form of the cam surfaces being such that the angular position of the lever is determined by the engagement of the roller with the cam surface on the arm coupled to the load-sensitive means on the less heavily loaded axle.

7. Brake actuating means as claimed in claim 6 wherein the means sensitive to the loading on an axle comprise a bell-crank lever of which one arm is coupled to a part of the axle suspension and the other arm is loaded by a spring or springs, and a resiliently yieldable arm carried by the bell-crank lever and coupled by a link to an arm on a shaft adapted to be connected to one of the said parallel arms.

8. Brake actuating means as claimed in claim 7 in which a damper is connected between the resiliently yieldable arm and a stationary part.

9. Brake actuating means as claimed in claim 1, and further including two independent power means for selectively actuating said first lever, and a mechanism between said first lever and one of said power means, said mechanism incorporating a certain degree of lost motion to allow said lever to be actuated by said one of said power means without affecting the other of said power means.

10. Brake actuating means as claimed in claim 9, wherein one of said power means comprises at least one vacuum motor.

References Cited

UNITED STATES PATENTS 2,342,765    2/1964    Stewart _____ 188—195

FOREIGN PATENTS 675,018    7/1952    Great Britain.

DUANE A. REGER, *Primary Examiner.*